Patented Oct. 31, 1922.

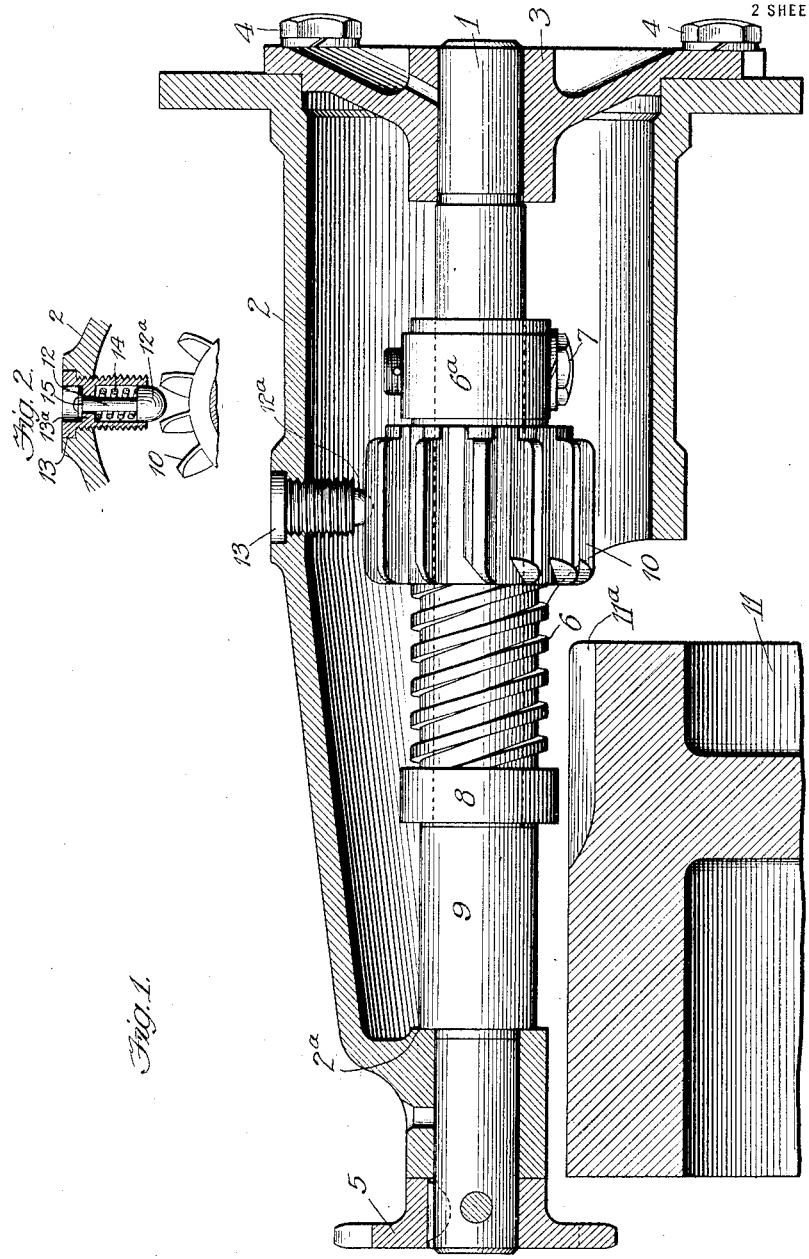

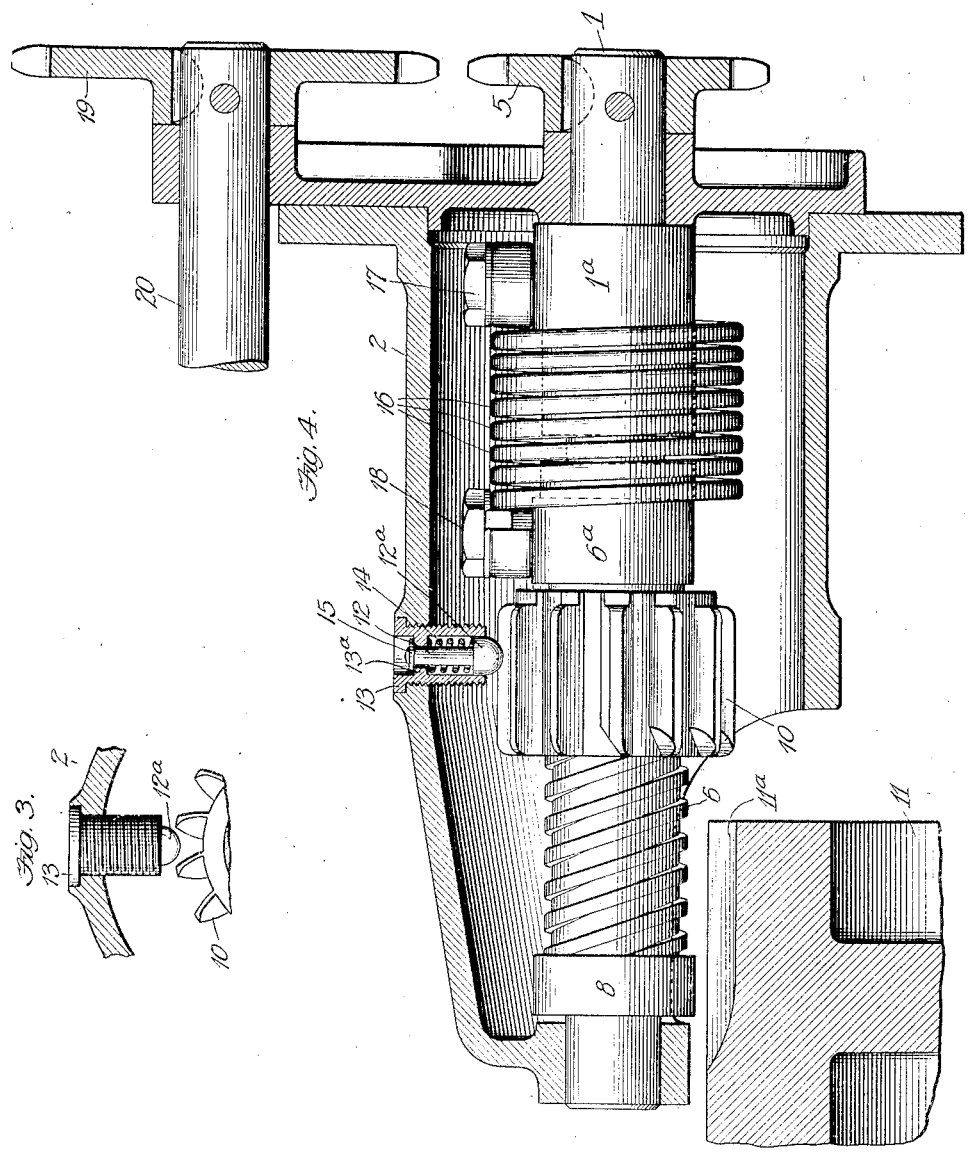

1,433,834

UNITED STATES PATENT OFFICE.

WILLIAM L. McGRATH, OF ELMIRA, NEW YORK, ASSIGNOR TO ECLIPSE MACHINE COMPANY, OF ELMIRA, NEW YORK, A CORPORATION OF NEW YORK.

ENGINE STARTER.

Application filed March 20, 1919. Serial No. 283,776.

*To all whom it may concern:*

Be it known that I, WILLIAM L. McGRATH, a citizen of the United States, residing at Elmira, in the county of Chemung and State of New York, have invented certain new and useful Improvements in Engine Starters, of which the following is a specification.

My invention relates to the drive or transmission portion of an engine starter, and the object thereof is to provide a simple, efficient and reliable construction of drive more particularly adapted for hand operation as distinguished from power operation through a starting motor, although such construction is capable of operation by either hand or power. The various features of advantage and utility in the construction and operation of my form of drive will be apparent from the description hereinafter given.

In the drawings Fig. 1 is an elevation of my drive showing the bearing bracket and portion of the fly wheel in section; Fig. 2 a sectional detail of the pinion detent; Fig. 3 a detail view of the detent and a portion of the pinion; and Fig. 4 a view similar to Fig. 1 but illustrating a modified form of construction.

The two forms of construction selected as embodiments of my invention for purposes of description, are intended to be operated by hand through the medium of sprocket wheels, although obviously such drive and indeed such sprocket wheels may be driven by a starting motor or the like.

Referring to the form illustrated in Fig. 1 the drive comprises a rotatable shaft 1 journaled in a bearing bracket consisting of a bracket proper marked 2, and an end head 3 secured thereto by the studs 4. This bracket not only forms bearings for the rotatable shaft but also forms a partially enclosing casing for the drive. To one end of this shaft there is secured a sprocket wheel 5 to which power is transmitted in suitable manner as by means of a sprocket chain, not shown.

A hollow screw shaft 6 is secured to the intermediate portion of the shaft 1 by means of the bolt 7 passing through the shaft 1 and through the enlarged end portion 6ª of the screw shaft. The left-hand or free end of the screw shaft has a stop nut or collar 8 secured thereto in suitable manner and acting as a stop for the pinion in its longitudinal movement for the meshing operation.

The driving pinion 10 is screw-threaded upon the screw shaft and is adapted to move longitudinally thereof when the shafts are rotated and to rotate therewith at the end of its longitudinal movement. When the pinion is advanced longitudinally to the left (Fig. 1) it meshes with the teeth 11ª of the engine member 11 which is here indicated as the fly wheel of an internal combustion engine. When the pinion is fully meshed with the fly wheel and comes into contact with the stop nut 8 its longitudinal movement will be stopped and it will thereupon rotate with the screw shaft and thereby rotate the fly wheel to start the engine.

The pinion herein shown is of plain form, that is, it is not weighted for the purpose of insuring longitudinal movement but means are provided to cooperate with the pinion to enforce this longitudinal movement during the time when it is disengaged from or out of mesh with the fly wheel and during the time it is intended to advance such pinion into mesh. Such means consists of a detent in the form of a yielding member adapted to be interposed between two adjacent teeth of the pinion, and as shown such member is mounted in the bearing bracket. As shown in the detail Fig. 2, such member consists of a plunger 12 having at its lower end a round head 12ª which is adapted to be normally positioned between two teeth of the pinion and to have a shallow penetration with respect thereto. This plunger slides within a sleeve or nipple 13 screw-threaded in an opening in the top of the bracket 2, and is spring-pressed inwardly towards the pinion by the spring 14. The head of the plunger slides in the central bore of the nipple and the stem portion slides through a hole in the reduced portion 13ª. The plunger is held in place by means of the washer 15.

The spring-pressed plunger is so positioned and possessed of such tension that it will prevent the rotation of the pinion when the screw shaft is rotated and it is intended to advance such pinion into engagement with the fly wheel. The construction is such that when the pinion is engaged with the fly wheel the right-hand end of the pinion teeth will in the particular construction shown, clear the plunger, the remainder of the longitudinal movement being enforced by the engagement with the fly wheel although in the broadest aspect of this invention the plunger might constantly coact with the pinion.

When the engine starts on its own power the pinion is automatically demeshed and returned to its normal or home position as shown in the drawings. When the pinion teeth are in contact with the plunger the latter will yield and permit the continuance of any rotary movement of such pinion which may occur in addition to longitudinal movement, and such plunger thus riding over the top edges of the teeth will serve to retard such rotation and will finally take its normal position between two teeth of the pinion when the latter has reached home position. The corners of the pinion teeth at the end opposite their meshing end are rounded, as shown, for proper cooperation with the plunger, so that when the pinion, in rotation, is being returned to normal position, these teeth and plunger will readily cooperate and the desired movement of the pinion will not be interfered with and the plunger will not be injured.

In Fig. 4 I have shown a modified form of construction in which the corresponding parts are similarly indicated by reference numerals. This construction is substantially the same as that of Fig. 1 except that it is provided with a yielding driving connection between the rotatable shaft and the screw shaft, whch connection, however, may be dispensed with as unnecessary in the case of hand cranking. As shown this yielding driving connection is a coiled spring 16 anchored at its ends respectively to the driving head 1ª of the shaft 1 and the driving head 6ª of the screw shaft by means of the screws or bolts 17 and 18, respectively. The power is thus transmitted through the shaft 1, driving head 1ª and spring 16 to the driving head 6ª of the screw shaft. In this construction there is shown a second sprocket wheel 19 adapted to drive the sprocket wheel 5 through a chain (not shown) and secured to a driving shaft 20 which is to be driven either directly or indirectly by hand or other means.

The spring-pressed plungers in these two forms of construction operate not only to enforce longitudinal movement of the pinion on the screw shaft when the latter is rotated, but also to prevent the creeping of the pinion as sometimes occurs due to vibration of the engine or the drive. By preventing rotation of the pinion when the screw shaft is at rest the pinion cannot creep, and the vibration of the parts is therefore without effect upon such pinion.

I claim:

1. An engine starter drive comprising a rotatable shaft, a pinion mounted thereon for longitudinal movement thereof and rotary movement therewith and adapted to mesh with a member of the engine to be started, and a spring pressed plunger operating radially of the axis of the pinion and normally adapted to have a shallow penetration between two of the pinion teeth and at all times offering a light resistance.

2. An engine starter comprising a rotatable shaft, a pinion mounted thereon for longitudinal movement thereof and rotary movement therewith, and adapted to engage a part of the engine to be started, a bearing bracket having bearings for both ends of said shaft, and a spring pressed plunger device cooperating with the pinion teeth and comprising a nipple extending through the bracket and a spring pressed plunger mounted to reciprocate in the nipple and to be projected from the inner end thereof and into cooperation with the pinion teeth.

3. An engine starter comprising a rotatable shaft, a pinion mounted thereon for longitudinal movement thereof and rotary movement therewith, and adapted to engage a part of the engine to be started, a bearing bracket having bearings for both ends of said shaft, and a spring pressed plunger device cooperating with the pinion teeth and comprising a nipple extending through the bracket and a spring pressed plunger mounted to reciprocate in the nipple and to be projected from the inner end thereof and into cooperation with the pinion teeth, said nipple being separate from the bracket and removably secured thereto, the entire plunger device being a unit insertible into the bracket.

4. An engine starter comprising a rotatable shaft, a pinion mounted thereon for longitudinal movement thereof and rotary movement therewith, and adapted to engage a part of the engine to be started, a bearing bracket for said shaft, and a spring pressed plunger device cooperating with the pinion teeth and comprising a nipple extending through the bracket and a spring pressed plunger mounted to reciprocate in the nipple and to be projected from the inner end thereof and into cooperation with the pinion teeth, said device having means for limiting the amount of projection of the plunger from the end of the nipple, said plunger having a shallow penetration into said pinion and offering slight resistance thereto.

WILLIAM L. McGRATH.